United States Patent [19]

Pinazzi et al.

[11] 4,212,718

[45] Jul. 15, 1980

[54] PROCESS FOR PRODUCING HYDROXYTELECHELIC OLIGOMERS AND POLYMERS BY PHOTOLYSIS

[75] Inventors: Christian Pinazzi, Le Bourg Coulans sur Gee; Jean-Claude Lenain, Le Mans; Jean-Claude Brosse, Connerre, all of France

[73] Assignee: Agence Nationale de Valorisation de la Recherche (ANVAR), Neuilly sur Seine, France

[21] Appl. No.: 897,074

[22] Filed: Apr. 17, 1978

Related U.S. Application Data

[63] Continuation of Ser. No. 672,917, Apr. 2, 1976, abandoned.

[30] Foreign Application Priority Data

Apr. 4, 1975 [FR] France .................................. 75 10621

[51] Int. Cl.$^2$ ............................ C08F 2/46; C08F 4/00
[52] U.S. Cl. ........................... 204/159.23; 204/159.24; 204/159.22; 526/212; 526/264; 526/303; 526/317; 526/319; 526/329.7; 526/340.2; 526/341; 526/344; 526/347.1; 526/348.6; 526/348.7

[58] Field of Search ...................... 204/159.22, 159.23, 204/159.24; 526/212

[56] References Cited

U.S. PATENT DOCUMENTS

| | | | |
|---|---|---|---|
| 3,137,737 | 6/1964 | Emrick et al. | 204/159.23 X |
| 3,673,168 | 6/1972 | Burke, Jr. et al. | 526/212 |
| 3,716,524 | 2/1973 | Cenci | 204/159.22 X |

OTHER PUBLICATIONS

Pinazzi et al, Jrnl. of polymer Science Symposium No. 42, 11-19 (1973).

*Primary Examiner*—Richard B. Turer
*Attorney, Agent, or Firm*—Alexis Barron

[57] ABSTRACT

The process enables the simultaneous production of hydroxytelechelic polymers and oligomers by the radical route. At least one ethylenically unsaturated monomer is polymerized in the presence of hydrogen peroxide under the effect of ultra-violet radiation. The polymerization is carried out in a diluent medium comprising essentially an alcohol. The process can be operated to produce polymers having average molecular weights between one hundred and one million and to produce selectively unimodal, bi-modal or multi-modal distributions of molecular weights.

31 Claims, No Drawings

PROCESS FOR PRODUCING HYDROXYTELECHELIC OLIGOMERS AND POLYMERS BY PHOTOLYSIS

This is a continuation, of application Ser. No. 672,917, filed Apr. 2, 1976, now abandoned.

FIELD OF THE INVENTION

The present invention relates to the field of polymerization by the radical route in the presence of hydrogen peroxide under the effect of ultra-violet radiation.

More particularly it relates to a process for obtaining hydroxytetechelic polymers and oligomers by the polymerization of monomers in the presence of hydrogen peroxide.

DESCRIPTION OF THE PRIOR ART

It is known to be possible to split perhydrol, the active component of hydrogen peroxide, by ultra-violet rays of wave length equal to 2537 Å, into two hydroxyl radicals.

This action of UV radiation has already been used for the copolymerization by the radical route of tetrafluoroethylene with propylene in the presence of hydrogen peroxide.

According to this method, described in "Polymer Letters Edition" vol. 12, pages 95–99 (1974) and "Journal of Polymer Science" vol. 12, pages 911–920 (1974), the copolymerizations are always carried out in emulsion under the effect of UV or $\gamma$ rays. The medium in which the polymerization is carried out in micellae is constituted by water and contains mostly an emulsifier. The one or more monomers used are hence insoluble in the medium and the polymerization is carried out in a binary system with very small amounts of initiator ($10^{-3}$ to $10^{-2}$ M/l $H_2O_2$).

The polymers or copolymers obtained according to this known process are insoluble in the medium and have a high number average degree of polymerization ($\overline{DP}n$), the average weights of these macromolecular components being comprised between 13,000 and 190,000.

The GPC shows a unimodal distribution of these polymers or copolymers which occur in the form of an aqueous emulsion of these solid compounds, that is to say a latex.

It would be interesting to obtain hydroxytelechelic oligomers, that is to say polymers of smaller weight, of the order of 100 to 20,000 for example. In fact, these polymers, generally liquid, have found numerous applications. In particular, polyisopropylenes, polybutadienes, polybutenes of low molecular weight and possessing at the chain ends functional groups such as —OH, —Br, —Cl, —CN, —COOH, —SO$_3$H, etc . . . are used as additives of lubricants or of certain fuels and essences, as adhesives, binders, propergol binders, etc . . . They can also be incorporated in natural or synthetic elastomers and their derivatives, in synthetic gums and the like. They can also be used to obtain alveolar masses of greater or less density by reaction with multifunctional molecules. These and other applications have been described by J. Brussas in "Information Chimie" n°128 of January 1974.

Such oligomers have already been obtained in the prior art by polymerizing monomers in the presence of hydrogen peroxide under the effect of heat. Such a process is described in French Patent Application 73, 24 392 filed by Applicants on July 3, 1973 for: "Preparation of telechelic polymers and products obtained thereby", and in U.S. Pat. No. 3,673,168.

OBJECTS AND SUMMARY OF THE INVENTION

It is an object of the present invention to provide an improved process for the preparation of hydroxytelechelic polymers and oligomers by the radical route.

It is another object of the invention to provide a process for the simultaneous production of hydroxytelechelic polymers and oligomers by the radical route, of molecular weights of the order of 100 to 20,000.

Other objects and advantages of the process of the present invention will be apparent from the description which follows.

According to the present invention there is provided a process for the simultaneous production of hydroxytelechelic polymers and oligomers by the radical route by the polymerization of at least one ethylenically unsaturated monomer in the presence of hydrogen peroxide under the effect of ultraviolet radiation, characterized in that said polymerization is carried out in a diluent medium comprising essentially an alcohol.

DESCRIPTION OF THE INVENTION

The reaction system according to the invention always comprises at least the following four elements:
one ethylenically unsaturated monomer
hydrogen peroxide
a diluent such as an alcohol
ultra-violet radiation.

The monomers which are capable of polymerization according to the process of the invention are compounds containing at least one ethylenic linkage, such as notably butene-2, isobutene, butadiene, isoprene, dimethyl-2,3 butadiene, methyl and ethyl acrylates, acrylic and methacrylic acids, methyl methacrylate, acrylonitrile, methacrylonitrile, vinyl acetate and chloride, styrene, $\alpha$-methyl-styrene, vinyl pyrrolidone, acrylamide, piperylene, or compatible mixtures of such monomers.

The wave length of the UV radiation used is, for reasons explained above, equal to 2537 Å. However, within the range of ultra-violet radiation (1800 to 4000 Å), any wave length capable of causing the homolytic splitting of perhydrol into hydroxyl radicals may be used.

By the present process, the polymerisations are carried out in an original manner, always in solution and if necessary in a precipitated phase, without any surfactant.

The concentrations of hydrogen peroxide are always superior to quantities usually used in catalytic systems and are from about 1% to about 20% or more by weight of the polymerization mixture; the reaction system is hence ternary.

The use of photolysis for obtaining hydroxytelechelic polymers according to the invention allows the high concentrations in $H_2O_2$; these concentrations were not possible in the polymerization processes by the thermic route owing to the instability of $H_2O_2$.

The polymers obtained are soluble or insoluble in the reaction mixture, according to the nature of the monomer, the composition of the reaction mixture and the amount of polymers in the mixture. When the polymer is soluble in its monomer and in alcohol, the GPC shows a unimodal distribution of molecular weights. When the polymer is not soluble in alcohol, the molecular weight distribution may be multimodal.

Without wishing to be bound to a particular theory, it is probable that this multimodal distribution of the macromolecules obtained is due on the one hand to a non-solvent effect exerted by the medium on the polymeric chains, favoring high molecular weights, and on the other hand, to the presence of zones of local over-concentration in solution, respectively of the monomer and of the hydrogen peroxide, favoring the formation of macromolecular chains of average and low $\overline{DPn}$.

It has now been discovered that it is possible through an appropriate choice of the alcoholic diluent to influence the unior multimodal repartition of the obtained polymers.

Thus, the composition and $\overline{DPn}$ of the polymers obtained by the process of the invention are different as on the one hand the monomer is polymerized in the presence of hydrogen peroxide and of an alcohol, said alcohol being a bad solvent of hydrogen peroxide but a good solvent of the monomer and polymer, or on the other hand the polymer is polymerized in the presence of hydrogen peroxide and of an alcohol, said alcohol being a good solvent of hydrogen peroxide and monomer but bad solvent of the polymer.

When the alcoholic diluent is a good solvent of hydrogen peroxide and monomer but a bad solvent of polymer, the GPC shows the existence, in the case of polymethylmethacrylate, of two, sometimes three or even four types of products clearly characterized by the length of chain: a fraction of low average molecular weight comprised between about 500 and about 2000, according to the quantity of the ingredients in the original reaction mixture, these products are called "oligomers"; a fraction of higher average molecular weight comprised between about 1000 and about 50,000, called polymers; moreover, it has sometimes been put in evidence the production of "High Polymers" of about 340,000 average molecular weight or "low oligomers" of about 400 average molecular weight.

On the contrary, when the alcoholic diluent is a bad solvent of hydrogen peroxide, but a good solvent of monomer and polymer, a bi- or unimodal repartition may be reached, the average molecular weight of the obtained polymers being increased.

Thus it will be possible for a man skilled in the art to obtain the required oligomers or polymers by using the process of the invention and by selecting a suitable alcohol diluent.

As a diluent, it is possible to use any alcohol, aliphatic or cyclic, which is liquid under the conditions of the experiment, such as, for example, methanol, ethanol, isopropanol, tertiary amyl alcohol, ter-butyl alcohol, cyclo hexanol, n-butanol, hexanol and the like. Methanol constitutes the preferred diluent. A mixture of the precited alcohols may be used.

In the case of poly(methyl methacrylate) for example, the following alcohols may be used as diluent medium being a solvent of the polymer and a bad solvent of hydrogen peroxide: all the aliphatic or cyclic $C_4$, $C_5$ or $C_6$ ... alcohols such as n-butanol, tert-butyl alcohol, tertiary amyl alcohol, hexanol, cyclohexanol, 2-butanol and the like. A mixture of two or more of these alcohols may be used.

The polymerization reactions are carried out preferably at ordinary temperature for the liquid monomers, for example between 10° and 20° C., and at boiling point for gaseous monomers. The technician skilled in the art will understand that, in the case of gaseous monomers, the polymerization can be carried out if necessary at ordinary temperature under pressure.

It is possible to use hydrogen peroxide with any concentration of perhydrol; preferably 110 or 130 volume hydrogen peroxide is used.

The hydrogen peroxide can be introduced in any proportion into the reaction mixture; generally, between 5 and 15% of hydrogen peroxide is used.

The concentration of the monomer may be at least of about 10% in weight of the reaction mixture.

The concentration of the diluent is always the complement to 100 of the hydrogen peroxide and of the monomer.

The UV radiation may be obtained, notably, from a low-pressure mercury vapor lamp, for example of the PCQ 9G1 type, manufactured by "Ultra-Violet Products Inc" (San Gabriel, California) 80% of the energy provided of which corresponds to a wavelength of 2537 Å and whose power is 2.5 Watts. This lamp may be for example dipped into the reaction medium. The tube of the lamp may be enclosed in a quartz tube, in order to obtain better exposure of the reaction mixture to the UV radiation.

It is another object of the present invention to provide oligomers and polymers obtained by the polymerization of monomers containing at least one ethylenic linkage in the presence of hydrogen peroxide under the effect of UV radiation in a diluent medium comprising essentially an alcohol.

These oligomers and polymers are hydroxytelechelic and have a number average weight comprised respectively between about 100 and about 2,000 and between about 2000 and about 1,000,000 in the case of polymethylmethacrylate.

The oligomers and polymers may be separated by any method known in itself and, for example, by a solvent/non solvent mixture such as, for example, a 15:85 benzene-methanol mixture by volume or a 15:25 by volume mixture of chloroform-ether.

EXAMPLES

Table IX below gives by way of example the molecular weight of some polymers and oligomers obtained by the process according to the invention and compares these weights with those obtained by the previously-used process of heat polymerization. It is evident that the weights of the oligomers obtained by the effect of UV radiation are notably less; thus, it is possible in certain cases to obtain dimers or trimers.

The number of hydroxyl groups may be determined by several methods; for example, NMR or determination by the action of acetyl chloride, may be mentioned.

Thus, the determination can be carried out from the NMR spectrum by the action of trifluoroacetic acid or by the reaction of the alcohol with trimethylchlorosilane.

It is also possible to carry out a determination with soda after reaction of the alcohol with acetyl chloride.

The results obtained are brought together in Table X below. It will be noted that the results obtained by the first method are systematically superior to those obtained with the two other methods.

The following examples of polymerisation are intended to illustrate the invention, and not to be limiting in any way.

EXAMPLE 1

40 g of methyl methacrylate were polymerized in the presence of 10 g of 110 volume hydrogen peroxide in 50 g of methanol.

The reaction was carried out at 18° C. in the presence of ultra-violet radiation emitted by a PCQ 9Gl lamp provided with a quartz tube and with stirring.

TABLE IX

| | Polymerization under the effect of ultra-violet radiation | | Polymerization by heat (at 120° C. for 4 hours) | |
|---|---|---|---|---|
| | vapor pressure osmometry | | vapor pressure osmometry | |
| Monomer | $\overline{Mn}$ | Solvent | $\overline{Mn}$ | Solvent |
| isoprene | 360 | toluene | 1500 | toluene |
| dimethyl-2,3 butadiene | 360 | toluene | 1500 | toluene |
| butadiene | 200 | Et CO Me | 700 | toluene |
| isobutene | 120 | Et CO Me | | |
| butene-2 | 160 | Et CO Me | 285 | THF |
| methyl acrylate | 1100 | Et CO Me | 12,000 | toluene |
| methyl methacrylate | 20,000 | toluene | 100,000 | toluene |
| methacrylonitrile | 260 | Et CO Me | | |
| α-methyl styrene | 240 | toluene | | |

The reaction lasted 3 hours.

In this way, 20 g of a polymer was obtained, having an average weight $\overline{Mn}=15,970$ and 8 g of an oligomer of average weight $\overline{Mn}=524$.

These macromolecules were hydroxytelechelic and possessed an average number of OH groups per molecule equal to 1.3 (measured by silylation).

It has now been studied the polymerization of methylméthacrylate from the mixture [hydrogen peroxide (110 vol)—méthyl methacrylate-methanol] U.V. (2537 Å) at room temperature.

The evolution of the conversion rates, average molecular weights, polydispersity indexes of polymers and oligomers, average number of OH/mole of oligomers, was studied as a function of the reaction duration, and the results are brought together in table I.

It has now been studied the polymerization of methyl methacrylate from the mixture [hydrogen peroxide (110 vol)—methyl methacrylate-methanol]-U.V. (2537 Å) during four hours at room temperature.

It was studied the evolution of the conversion rates, average molecular weights, polydispersity indexes of polymers and oligomers, and of molecular weight at the top of the GPC peak of each simple fraction, as a function of the hydrogen peroxide quantities. Reaction mixture (mixture $H_2O$-$H_2O_2$ (110 vol): 6.7 g—methyl methacrylate: 20 g-methanol: 40 g The results are brought together in table II.

TABLE I

| reaction duration, hours | conversion rates | | $\overline{Mn}$ (GPC) | | I polydispersity | | average number of OH/mole of oligomer (silylation) |
|---|---|---|---|---|---|---|---|
| | polymers | oligomers | polymers | oligomers | polymers | oligomers | |
| 1 | 12 | 3 | 16610 | 683 | 2.76 | 2.27 | 1.2 |
| 2 | 29 | 7 | 16826 | 817 | 2.77 | 3.46 | 0.9 |
| 3 | 45 | 11 | 15970 | 524 | 2.86 | 3.25 | 1.5 |
| 5 | 83 | 17 | 17232 | 529 | 2.93 | 2.36 | 1.0 |
| 7 | 85 | 15 | 15471 | 428 | 3.15 | 2.25 | 0.9 |

TABLE X

DETERMINATION OF THE HYDROXYL GROUPS

| | by nuclear magnetic resonance | | | | by acetylation by $CH_3 CO Cl$ | |
|---|---|---|---|---|---|---|
| | Direct NMR by TFA ac. | | Indirect NMR by CLSi $(CH_3)_3$ | | | |
| MONOMER | Solvent | Amount OH/mole | Solvent | Amount OH/mole | Solvent | Amount OH/mole |
| isoprene | DC $Cl_3$ | 2 | $HCCl_3$ | 0.3 | EtCOMe | 1.9 |
| dimethyl-2,3 butadiene | DC $Cl_3$ | 4 | $HCCl_3$ | 1.4 | toluene | 1.4 |
| butadiene | DC $Cl_3$ | 2 | $HCCl_3$ | 0.3 | EtCOMe | 1.8 |
| isobutene 1 | DC $Cl_3$ | 4.5 | $HCCl_3$ | 1.6 | EtCOMe | 1.6 |
| isobutene 2 | DC $Cl_3$ | 3 | $HCCl_3$ | 0.7 | EtCOMe | 1.2 |
| isobutene 3 | DC $Cl_3$ | 2.4 | $HCCl_3$ | 0.2 | EtCOMe | 0.8 |
| butene-2 | DC $Cl_3$ | 3 | $HCCl_3$ | 0.7 | EtCOMe | 1.1 |
| methyl acrylate | DC $Cl_3$ | — | $HCCl_3$ | 0.7 | EtCOMe | 0.1 |
| methyl methacrylate | DC $Cl_3$ | 5 | benzene | 1.1 | toluene | 1.1 |
| methacrylonitrile | DC $Cl_3$ | 1.6 | $HCCl_3$ | 1.2 | EtCOMe | 1 |
| α-methyl-styrene | DC $Cl_3$ | 0.7 | — | | | |
| Butene-2 isobutene copolymer | DC $Cl_3$ | 2 | $HCCl_3$ | 1.8 | EtCOMe | 1.4 |

TABLE II

| Hydrogen peroxide 110 vol g | conversion rates (GPC) | | $\overline{Mn}$ (GPC) | | I (GPC) polydispersity index | | Ms weight at the top of the GPC peak | |
|---|---|---|---|---|---|---|---|---|
| | oligomers | polymers | oligomers | polymers | oligomers | polymers | oligomers | polymers |
| 0 | — | — | — | — | — | — | — | — |
| 1 | 2.5 | 19 | 1158 | 45564 | 2.22 | 3.05 | 400 and | 60000 and |

TABLE II-continued

| Hydrogen peroxide 110 vol g | conversion rates (GPC) | | $\overline{Mn}$ (GPC) | | I (GPC) polydispersity index | | Ms weight at the top of the GPC peak | |
|---|---|---|---|---|---|---|---|---|
| | oli-gomers | poly-mers | oli-gomers | poly-mers | oli-gomers | poly-mers | oli-gomers | poly-mers |
| 2 | 3.5 | 23.5 | 928 | 39140 | 2.02 | 3.25 | 2100 400 and 1750 | 340000 49999 and 330000 |
| 3 | 6.5 | 43 | 760 | 36284 | 1.79 | 4.6 | 400 and 1200 | 40000 and 340000 |

It was studied the evolution of the conversion rates of polymers and oligomers, the average number of OH/-mole of oligomer, as a function of the percentage in monomer. The reaction mixture comprised: hydrogen peroxide (110 vol): 10% in weight; methyl methacrylate; methanol, UV. 2537 Å).

The results are brought together in table III.

TABLE III

| methyl metha-crylate % in weight | methanol % in weight | conversion rates (GPC) | | average number of OH/mole of oligomer | |
|---|---|---|---|---|---|
| | | poly-mers | oli-gomers | sily-lation | acety-lation |
| 10 | 80 | 26 | 42 | 0.7 | 0.8 |
| 20 | 70 | 48 | 22 | 1.4 | 0.8 |
| 30 | 60 | 56 | 19 | 1.3 | 0.5 |
| 40 | 50 | 50 | 20 | 1.3 | 1.1 |
| 50 | 40 | 69 | 15 | 0.9 | 0.2 |
| 60 | 30 | 77 | 13 | 1.2 | 0.9 |
| 70 | 20 | 82 | 15 | 1.9 | 0.6 |
| 80 | 10 | 82 | 14 | 2.2 | 1.2 |
| 90 | 0 | 50 | 10 | — | — |

It was studied the evolution of the average molecular weights ($\overline{Mn}$), polydispersity indexes (I) of oligomers and polymers and of weights (Ms) of simple fractions of oligomers and polymers at the top of the peak of GPC, as a function of the percentage in monomer. The reaction mixtures comprised: hydrogen peroxide (110 vol): 10% in weight; methyl methacrylate; methanol, U.V. (2537 Å). The results are brought together in table IV.

TABLE IV

| methyl me-thacrylate % in weight | methanol in weight | $\overline{Mn}$ (GPC) | | I polydispersity | | Ms | |
|---|---|---|---|---|---|---|---|
| | | poly-mers | oli-gomers | poly-mers | oli-gomers | poly-mers | oli-gomers |
| 10 | 80 | 3270 | 334 | 4.42 | 1.3 | 3350 | 250 |
| 20 | 70 | 7728 | 407 | 3.89 | 1.4 | 10500 | 380 |
| 30 | 60 | 11622 | 490 | 3.13 | 1.6 | 16500 | 420 |
| 40 | 50 | 18994 | 524 | 2.5 | 2.2 | 24000 | 950 |
| 50 | 40 | 30140 | 919 | 1.2 | 2.2 | 28000 | 1220 |
| 60 | 30 | 20488 | 936 | 2.1 | 2.7 | 30000 | 1520 |
| 70 | 20 | 31732 | 1446 | 2.2 | 3.3 | 49000 | 1750 |
| 80 | 10 | 37873 | 1695 | 2.4 | 3.7 | 65000 | 2170 |
| 90 | 0 | 48034 | 2441 | 2.8 | 4.2 | 73000 | 3124 |

EXAMPLES 2 to 19

The following monomers were polymerized by the process of the invention.

TABLE V

| LIST A | LIST B |
|---|---|
| acrylic acid | isoprene |
| methacrylic acid | dimethyl-2,3-butadiene |
| acrylamide | butadiene |
| acrylonitrile | isobutene |
| ethyl acrylate | butene-2 |
| vinyl acetate | methyl acrylate |
| styrene | methyl methacrylate |
| vinyl chloride | methacrylonitrile |
| | α-methyl styrene |

The monomers of list A might be polymerized as indicated in table VI hereinafter, that is to say without $H_2O_2$; in this case it is evident that hydroxytelechelic polymers would not be obtained.

On the contrary, the monomers of list B imply the use of $H_2O_2$ for polymerizing through U.V. photolysis process according to the present invention.

TABLE VI

| Monomer | reaction mixture % in weight | | | | T °C. | reaction duration (minutes) | global conversion rates | remarks |
|---|---|---|---|---|---|---|---|---|
| | $H_2O_2$ (110 vol) | $H_2O$ | monomer | metha-nol | | | | |
| vinyl acetate | 10 | — | 50 | 40 | 24 | 16 | 75 | colorless |
| | 30 | — | 40 | 30 | 24 | 22 | 85 | viscous |
| | — | 10 | 30 | 60 | 24 | 10 | 90 | liquid |
| | — | — | 30 | 70 | 24 | 24 | 60 | |
| | — | — | 100 | — | 24 | 24 | 70 | |
| styrene | 10 | — | 20 | 70 | 16 | 27 | 38 | |
| | 10 | — | 20 | 70 | 2 | 22 | 30 | yellow |
| | — | 10 | 20 | 70 | 16 | 22 | 20 | oil |
| vinyl chloride | 20 | — | 30 | 50 | −14 | 1.00 | 2 | |
| | — | 20 | 30 | 50 | −14 | 0.20 | 2 | white |
| | — | — | 50 | 50 | −14 | 0.20 | 2 | powder |
| | — | — | 100 | — | −14 | 0.10 | 2 | |
| acrylic | 10 | — | 20 | 70 | 17 | 22 | 90 | white |

TABLE VI-continued

| Monomer | reaction mixture % in weight | | | | T °C. | reaction duration (minutes) | global conversion rates | remarks |
|---|---|---|---|---|---|---|---|---|
| | H₂O₂ (110 vol) | H₂O | monomer | methanol | | | | |
| acid | — | 10 | 20 | 70 | 17 | 7 | 75 | powder |
| methacrylic | 10 | — | 20 | 70 | 16 | 22 | 88 | white |
| acid | — | 10 | 20 | 70 | 16 | 22 | 90 | powder |
| | — | — | 30 | 70 | 16 | 22 | 90 | |
| | — | — | 100 | — | 16 | 3 | 100 | |
| acrylamide | 10 | — | 20 | 70 | 11 | 22 | 100 | viscous |
| | — | 10 | 20 | 70 | 11 | 22 | 100 | colorless liquid |
| acrylonitrile | 10 | — | 50 | 40 | 14 | 2 | 7 | white |
| | — | 10 | 50 | 40 | 14 | 2 | 7 | powder |
| | — | — | 50 | 50 | 14 | 2 | 9 | |
| | — | — | 100 | — | 14 | 2 | 7 | |
| ethyl acrylate | 10 | — | 40 | 50 | 13 | 5 | 100 | coloress |
| | — | 10 | 40 | 50 | 13 | 0.10 | 100 | viscous |
| | — | — | 60 | 40 | 13 | 0.10 | 100 | liquid |
| | — | — | 100 | — | 15 | 0.05 | 100 | |
| isoprene | 10 | — | 20 | 70 | 14 | 22 | 30 | yellow |
| | 10 | — | 50 | 40 | 14 | 22 | 15 | oil |
| | — | 10 | 20 | 70 | 14 | 22 | 8 | |
| | — | — | 50 | 50 | 14 | 22 | 6 | |
| | — | — | 100 | — | 14 | 22 | 1 | |
| dimethy-2,3-butadiene | 10 | — | 20 | 70 | 25 | 22 | 45 | |
| | — | 10 | 20 | 70 | 25 | 22 | 3 | yellow |
| | — | — | 40 | 60 | 25 | 22 | 5 | oil |
| | — | — | 100 | — | 25 | 22 | 3 | |
| butadiene | 10 | — | 20 | 70 | 14 | 17 | 12 | colorless |
| | 20 | — | 30 | 50 | −7 | 17 | 17 | oil |
| | — | 20 | 30 | 50 | −7 | 17 | 0.3 | |
| | — | — | 30 | 70 | −7 | 17 | 0.5 | |
| | — | — | 100 | — | −7 | 17 | 0.2 | |
| isobutene | 20 | — | 30 | 50 | −3 | 22 | 20 | |
| | 20 | — | 30 | 50 | −12 | 22 | 20 | |
| | — | 20 | 30 | 50 | −3 | 22 | 0.2 | colorless |
| | — | 20 | 30 | 50 | −12 | 22 | 0.2 | oil |
| | — | — | 30 | 70 | −12 | 22 | 0.2 | |
| | — | — | 100 | — | −12 | 22 | 0 | |
| butene-2 | 20 | 20 | 30 | 50 | 4 | 22 | 10 | colorless |
| | — | — | 20 | 80 | 4 | 22 | 0.7 | oil |
| methyl acrylate | 10 | — | 20 | 70 | 13 | 7 | 95 | colorless |
| | — | 10 | 20 | 70 | 13 | 22 | 0 | viscous |
| | — | — | 20 | 80 | 13 | 22 | 0 | liquid |
| | — | — | 100 | — | 13 | 22 | 0 | |
| methyl methacrylate | 10 | — | 40 | 50 | 18 | 22 | 55 | white |
| | — | 10 | 40 | 50 | 18 | 22 | 3 | powder |
| | — | — | 40 | 60 | 18 | 22 | 4 | |
| | — | — | 100 | — | 18 | 22 | 0 | |
| methacrylontrile | 10 | — | 20 | 70 | 13 | 22 | 90 | yellow |
| | — | 10 | 40 | 50 | 13 | 22 | 9 | oil |
| | — | — | 50 | 50 | 13 | 22 | 4 | |
| | — | — | 100 | — | 13 | 22 | 4 | |
| α-methyl styrene | 10 | — | 20 | 70 | 16 | 22 | 15 | yellow |
| | — | 10 | 20 | 70 | 16 | 22 | 0 | oil |
| | — | — | 30 | 70 | 16 | 22 | 0 | |
| | — | — | 100 | — | 16 | 22 | 0 | |

It was studied the influence of the kind of the alcoholic diluent on the repartition of molecular weights, conversion rates, average molecular weights and polydispersity indexes, by comparison with methyl methacrylate when polymerized from a simple mixture (H₂O₂-monomer-methanol-U.V.)

EXAMPLE 20

Polymerization of methyl methacrylate from the reaction mixture (H₂O₂-methyl methacrylate cyclohexanol; U.V. (2537 Å); Reaction durational hour.

TABLE VII

| Composition of the reaction mixture % in weight | | | Conversion rates | | Mn GPC | | | Polydispersity index | | |
|---|---|---|---|---|---|---|---|---|---|---|
| H₂O₂ (110 vol) | methyl methacrylate | cyclohexanol | olig. | polym. | global | olig. | polym. | global | olig. | polym. |
| 10 | 20 | 70 | 9 | 32 | 7936 | 1971 | 26208 | 5.73 | 1.47 | 2.03 |
| 10 | 50 | 40 | 2 | 28 | 27116 | 2442 | 45320 | 3.80 | 1.51 | 2.06 |
| 10 | 70 | 20 | 1 | 19 | 38373 | 5340 | 76387 | 3.71 | 1.36 | 2.31 |

EXAMPLE 21

Polymerization of methyl methacrylate from the reaction mixture H$_2$O$_2$-methyl methacrylate-tertio amyl alcohol; UV (2537 Å).

TABLE VIII

| Composition of the reaction mixture % in weight | | | Conversion rates | | | Mn GPC | | | Polydispersity index | | |
|---|---|---|---|---|---|---|---|---|---|---|---|
| H$_2$O$_2$ (110 vol) | methyl methacrylate | t. am. OH | olig. | polym. | global | olig. | polym. | global | olig. | polym. |
| 5 | 60 | 35 | 1.6 | 22.3 | 23898 | 2220 | 46628 | 3.90 | 1.43 | 2.15 |

We claim:

1. A polymerization process in which an ethylenically unsaturated monomer selected from the group consisting of acrylic acid, methacrylic acid, a lower alkyl acrylate, a lower alkyl methacrylate, acrylamide, vinyl pyrrolidone, vinyl acetate, acrylonitrile, and methacrylonitrile is polymerized by the radical route to form hydroxytelechelic polymers having a multi-modal distribution of molecular weights and including polymers having a number average molecular weight between about 100 and 1 million, said polymerization process comprising effecting the polymerization at room temperature in the presence of oxygen under the effect of ultra-violet radiation having a wave length capable of causing the homolytic splitting of perhydrol into hydroxyl radicals of at least one of said monomers in a reaction mixture including at least about 10% by weight of said monomer and about 1 to about 20% by weight of hydrogen peroxide, and the remainder of the reaction mixture consisting essentially of an alcohol, wherein said alcohol is a good solvent for said hydrogen peroxide and said monomer and a bad solvent for said polymer.

2. A process according to claim 1 wherein said reaction mixture includes about 5 to about 15% by weight of hydrogen peroxide.

3. A process according to claim 2 wherein said wave length is 2537 Å.

4. A polymerization process in which methyl methacrylate is polymerized by the radical route to form hydroxytelechelic poly(methyl methacrylate) polymers having a multi-modal distribution of molecular weights (number average) including a fraction between about 500 and about 2000, a fraction between about 1000 and 50,000, and a fraction in excess of 50,000, said polymerization process comprising effecting the polymerization at room temperature in the presence of oxygen under the effect of ultra-violet radiation having a wave length capable of causing the homolytic splitting of perhydrol into hydroxyl radicals of said monomer in a reaction mixture including at least about 10% by weight of said monomer and about 1 to about 20% by weight of hydrogen peroxide, and the remainder of the reaction mixture consisting essentially of an alcohol, wherein said alcohol is a good solvent for said hydrogen peroxide and said monomer and a bad solvent for said polymer.

5. A process according to claim 4 wherein said reaction mixture includes about 5 to about 15% by weight of hydrogen peroxide.

6. A process according to claim 5 wherein said wave length is 2537 Å.

7. A process according to claim 2 wherein said distribution includes a fraction below about 500.

8. A polymerization process in which an ethylenically unsaturated monomer selected from the group consisting of acrylic acid, methacrylic acid, a lower alkyl acrylate, a lower alkyl methacrylate, acrylamide, vinyl pyrrolidone, vinyl acetate, acrylonitrile, and methacrylonitrile is polymerized by the radical route to form hydroxytelechelic polymers having a unimodal or bi-modal distribution of molecular weights including polymers having a number average molecular weight between about 100 and 1 million, said polymerization process comprising effecting the polymerization at room temperature in the presence of oxygen under the effect of ultra-violet radiation having a wave length capable of causing the homolytic splitting of perhydrol into hydroxyl groups of at least one of said monomers in a reaction mixture including at least about 10% by weight of said monomer and about 1 to about 20% by weight of hydrogen peroxide, and the remainder of the reaction mixture consisting essentially of an alcohol, wherein said alcohol is a good solvent for said monomer and said polymer and a bad solvent for said hydrogen peroxide.

9. A process according to claim 8 wherein said monomer is methyl methacrylate.

10. A process according to claim 8 wherein said reaction mixture includes about 5 to about 15% by weight of hydrogen peroxide.

11. A process according to claim 10 wherein said wave length is 2537 Å.

12. A polymerization process in which an ethylenically unsaturated monomer selected from the group consisting of acrylic acid, methacrylic acid, a lower alkyl acrylate, a lower alkyl methacrylate, acrylamide, vinyl pyrrolidone, vinyl acetate, acrylonitrile, and methacrylonitrile is polymerized by the radical route to form hydroxytelechelic homopolymers having a number average molecular weight in excess of 20,000, said polymerization process comprising effecting the polymerization at room temperature in the presence of oxygen under the effect of ultra-violet radiation of said monomer in a reaction mixture including said monomer, at least about 1% by weight of hydrogen peroxide, and a diluent consisting essentially of an alcohol.

13. A polymerization process in which a polymerizable monomer is polymerized by the radical route to form hydroxytelechelic polymers having a number average molecular weight between about 20,000 and 100,000 comprising polymerizing at least one ethylenically unsaturated monomer of the group consisting of lower alkyl acrylates and methacrylates, acrylic and methacrylic acids, acrylamide, vinyl pyrrolidone, vinyl acetate, acrylonitrile and methacrylonitrile, in the presence of hydrogen peroxide and oxygen under the effect of ultra-violet radiation, said polymerization being carried out in a diluent comprising essentially an alcohol.

14. A process according to claim 13 wherein the concentration of hydrogen peroxide is at least equal to about 1% by weight of the reaction mixture.

15. A process according to claim 13, wherein the diluent is an alcohol.

16. A process according to claim 15 wherein the alcohol is methanol, ethanol, isopropanol or tertiary-amyl alcohol, tert-butyl alcohol, cyclohexanol, n-butanol or hexanol.

17. A process according to claim 15 wherein the diluent is a good solvent for said hydrogen peroxide and said monomer, but a bad solvent for said polymer.

18. A process according to claim 15 wherein the diluent is a bad solvent for said hydrogen peroxide, but a good solvent for said monomer and said polymer.

19. A process according to claim 7 wherein said diluent is methanol.

20. A process according to claim 18 wherein said diluent is cyclohexanol or tertiary-amyl alcohol.

21. A process according to claim 13 wherein the wavelength of ultra-violet radiation is 2537 Å.

22. Polymers prepared according to the process of claim 18 characterized in that the monomer is methyl methacrylate and the repartition of the polymer is essentially unimodal.

23. A process according to claim 1, 8, 12 or 13 in which a mixture of two or more of said monomers is polymerized.

24. A process according to claim 1, 8, 12 or 13 wherein one of said monomers is polymerized to form a homopolymer.

25. A polymerization process in which a polymerizable monomer is polymerized by the radical route to form hydroxytelechelic polymers, said polymerizable monomer being selected from the group consisting of vinyl pyrrolidone and vinyl acetate and an aliphatic compound having no more than one ethylenically unsaturated polymerizable group of the formula

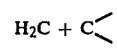

wherein one of the free bonds of the carbon atom in said formula is attached to a carbon atom and the other of the free bonds of said carbon atom is attached to a carbon atom or a hydrogen atom, said polymerization process comprising polymerizing in the presence of oxygen one or more of said polymerizable monomers at room temperature under the effect of ultra-violet radiation in a reaction mixture including also an aqueous solution of hydrogen peroxide and a diluent consisting essentially of an alcohol.

26. A process according to claim 25 in which the molecular weight distribution of the polymer formed is unimodal and in which the polymer is soluble in said monomer and said alcohol.

27. A process according to claim 25 in which the molecular weight distribution of the polymer formed is multimodal and in which the polymer is insoluble in said alcohol.

28. A process according to claim 25, 26, or 27 including at least about 10% by weight of said monomer, hydrogen peroxide in an amount equivalent to about 1 to about 20% by weight of an aqueous solution of 110 volume hydrogen peroxide, and the remainder of the reaction mixture consisting essentially of said alcohol.

29. A process according to claim 25 in which a mixture of two or more of said monomers is polymerized.

30. A process according to claim 25 wherein one of said monomers is polymerized to form a homopolymer.

31. A process according to claim 25, 26 or 27 wherein said monomers are selected from the group consisting of acrylic acid, methacrylic acid, lower alkyl acrylates and methacrylates, acrylonitrile, and methacrylonitrile.

* * * * *

UNITED STATES PATENT AND TRADEMARK OFFICE
CERTIFICATE OF CORRECTION

PATENT NO. : 4,212,718
DATED : July 15, 1980
INVENTOR(S) : Christian Pinazzi et al It is certified that error appears in the above—identified patent and that said Letters Patent is hereby corrected as shown below:

Column 1, line 14, for "hydroxytetechelic" read --hydroxytelechelic--.

Column 3, line 15, for "unior" read --uni- or--.

Columns 9-10 (Table VI), line 23, for "dimethy" read --dimethyl--.

Column 10, line 56, for "durational" read --duration: 1--.

Columns 9-10 (Table VII), third column heading, for "cycloho" read --cyclohe--.

Claim 19, line 1, for "7" read --17--.

Claim 25, in the formula, for "+" read -- = --.

Signed and Sealed this

Fourteenth Day of October 1980

[SEAL]

Attest:

SIDNEY A. DIAMOND

Attesting Officer

Commissioner of Patents and Trademarks